United States Patent
Weiser et al.

(10) Patent No.: US 7,028,636 B2
(45) Date of Patent: Apr. 18, 2006

(54) ROTATABLE BIRD FEEDER

(75) Inventors: Margaret Weiser, Tarzana, CA (US); Isaac Weiser, Tarzana, CA (US)

(73) Assignee: Exhart Environmental Systems, Inc., Chatsworth, CA (US)

( * ) Notice: Subject to any disclaimer, the term of this patent is extended or adjusted under 35 U.S.C. 154(b) by 0 days.

(21) Appl. No.: 10/843,191

(22) Filed: May 10, 2004

(65) Prior Publication Data

US 2005/0263084 A1    Dec. 1, 2005

(51) Int. Cl.
     *A01K 39/00* (2006.01)
(52) U.S. Cl. .................................................. 119/57.8
(58) Field of Classification Search ............... 119/57.8, 119/52.2, 52.3, 57.9
See application file for complete search history.

(56) References Cited

U.S. PATENT DOCUMENTS

| | | | | |
|---|---|---|---|---|
| 3,126,870 | A * | 3/1964 | Matthew | 119/57.9 |
| 3,784,024 | A | 1/1974 | Kristy | 211/131 |
| 3,999,519 | A | 12/1976 | Rodemeyer | 119/29 |
| 4,399,772 | A | 8/1983 | Salinas | 119/51.5 |
| 4,526,134 | A | 7/1985 | Sapp | 119/51 |
| 4,574,822 | A | 3/1986 | Helinsky | 132/79 |
| D285,592 | S | 9/1986 | Kushner | D21/108 |
| 5,003,925 | A | 4/1991 | Roberts | 119/51.15 |
| 5,021,901 | A | 6/1991 | Mondocea et al. | 360/92 |
| 5,022,346 | A | 6/1991 | Robertson | 119/52.2 |
| 5,039,180 | A | 8/1991 | Lemons | 312/267 |
| 5,165,364 | A | 11/1992 | Horkey | 119/57.8 |
| D342,587 | S | 12/1993 | Bransky et al. | 119/52.2 |
| 5,355,835 | A * | 10/1994 | Freed | 119/57.9 |
| 5,370,247 | A | 12/1994 | Handleman | 211/164 |
| 5,372,474 | A | 12/1994 | Miller | 415/916 |
| 5,387,146 | A | 2/1995 | Smith et al. | 446/219 |
| D361,172 | S | 8/1995 | Gates | 119/57.8 |
| D408,947 | S | 4/1999 | Mandell | D30/124 |
| 6,305,319 | B1 * | 10/2001 | Olsson | 119/51.01 |
| 6,394,030 | B1 * | 5/2002 | Geiger et al. | 119/57.8 |
| D471,326 | S * | 3/2003 | Weiser et al. | D30/124 |
| 6,557,491 | B1 * | 5/2003 | Weiser et al. | 119/57.8 |
| 6,837,178 | B1 * | 1/2005 | Nall et al. | 119/57.8 |

FOREIGN PATENT DOCUMENTS

| EP | 0099657 | * | 2/1984 |
|---|---|---|---|
| GB | 2127266 | * | 4/1984 |

* cited by examiner

*Primary Examiner*—Peter M. Poon
*Assistant Examiner*—David Parsley
(74) *Attorney, Agent, or Firm*—Cislo & Thomas, LLP

(57) ABSTRACT

Disclosed herein are rotatable bird feeders. The bird feeders are composed of a generally planar surface having one or more containers positioned about the perimeter of the generally planar surface. In one embodiment, the containers have a first well coupled to a second well. The bird feeder also includes an axle having a first and second end where the first end of the axle is pivotally coupled to the generally planar surface and the second end is coupled to an adapter. The adapter may be coupled to a post or rod or the like to mount the bird feeder in a desired location.

20 Claims, 4 Drawing Sheets

ROTATABLE BIRD FEEDER

BACKGROUND

Various types of bird feeders have been developed in prior art to attract a variety of birds to a particular location where individuals can observe the birds as they feed. Traditionally, bird feeders are receptacles that may be mounted on a pole or the like to protect the feeding birds from predators such as cats or dogs. In other types of bird feeders, the bird feeders may be hung from tree branches or the like. These prior bird feeders are generally stationary items that do not move. However, there have been a variety of rotatable feeders that have been developed that allow for the simultaneous feeding of a plurality of birds. While these prior art bird feeders have been useful, there still remains a need for a rotatable bird feeder.

SUMMARY

Various embodiments disclosed herein are directed to a rotatable bird feeder. According to one embodiment, the bird feeder is composed of a generally planar surface having one or more containers positioned about the perimeter of the generally planar surface. In one embodiment, the containers have a first well coupled to a second well. The bird feeder also includes an axle having a first and second end where the first end of the axle is pivotally coupled to the generally planar surface and the second end is coupled to an adapter. The adapter may be coupled to a post or rod or the like to mount the bird feeder in a desired location.

According to the other embodiments described herein, the bird feeder may have a generally planar surface that is circular, star shaped, or other fanciful shape. The containers may be rotatably coupled to the planar surface by a shaft or other means. Additionally, the axle may be coupled to the adapter such that the axle is generally perpendicular to the bore of the adapter. In another embodiment, the axle may be coupled to the end of the adapter wherein the longitudinal axis of the axle and the longitudinal axis of the adapter are generally planar. Furthermore, in another embodiment, the containers may comprise a ridge coupled to the perimeter of the first and second well. Additionally, the first well and the second well of the container may be attached together via a coupling member. In another embodiment, the first well and second well may be directly coupled together.

DETAILED DESCRIPTION

The detailed description set forth below in connection with the appended drawings is intended as a description of exemplary embodiments and is not intended to represent the only forms in which the embodiments may be constructed and/or utilized. However, it is to be understood that the same or equivalent functions and sequences may be accomplished by different embodiments that are also intended to be encompassed within the spirit and scope of the specification.

Figure 1:
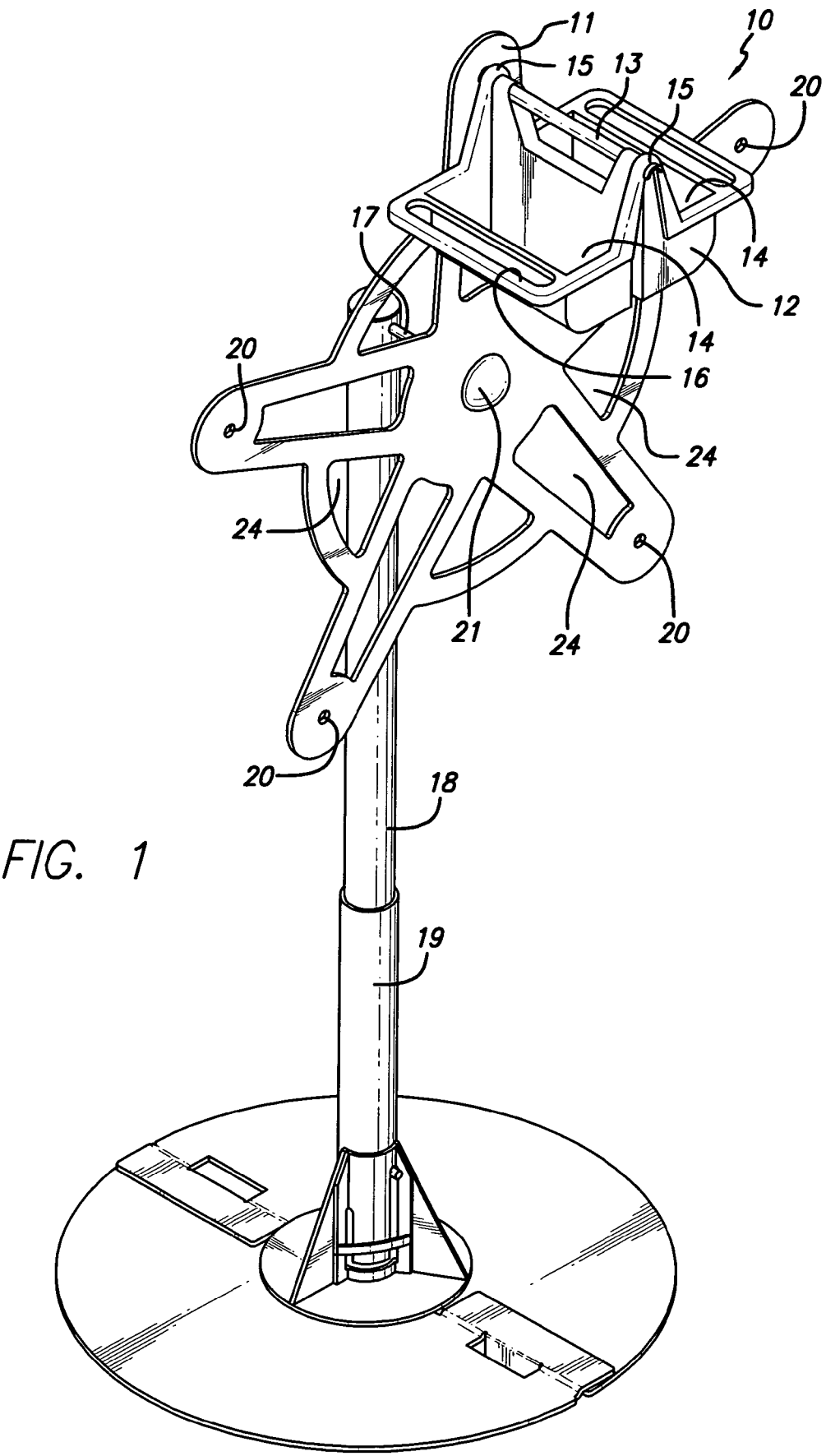
FIG. 1 is a perspective view of one embodiment of a rotatable bird feeder.

Turning now to the Figures, FIG. 1 shows one exemplary embodiment of a bird feeder 10. The bird feeder 10 is composed of a generally planar surface 11. As shown in FIG. 1, the generally planar surface 11 is star-shaped. In another embodiment, the generally planar surface 11 may have a circular shape or any other fanciful shape. For instance, the generally planar surface 11 may be a triangle, square, pentagon, or other polygonal shape. The generally planar surface 11 also can include one or more openings 24 that are spaced about throughout the generally planar surface 11. In other embodiments, the generally planar surface 11 may be a generally solid structure without any openings 24.

The generally planar surface 11 has a plurality of positions 20 wherein one or more containers 12 may be coupled thereto. These positions 20 are usually openings that allow a shaft 13 to be fixed to the generally planar surface 11. According to one embodiment, the shaft 13 is generally perpendicular to the generally planar surface 11. In other embodiments, the shaft 13 may be mounted at an angle. As shown in FIG. 1, shaft 13 is a generally elongate and straight member. In an alternate embodiment, the shaft 13 may be L-shaped or have other fanciful shapes. As shown in the FIG. 1, a single container 12 is coupled to the generally planar surface 11. In other embodiments, one or more containers 12 may be coupled to the generally planar surface 11. For instance, the bird feeder 10 may contain 1, 2, 3, 4, or 5 containers.

The container 12 may have one or more wells 14. The wells 14 are sized to hold an amount of bird feed or other types of food for an animal. As shown in FIG. 1, the container 12 includes two wells 14. In one embodiment, the wells 14 may be directly coupled to each other. In the embodiment shown in FIG. 2, the wells 14 are coupled together by a coupling member 15. The coupling member 15 may be a generally inverted V-shaped member that connects wells 14 together. In other embodiments, the coupling member 15 may be a generally U-shaped member or other types of shapes known or contemplated in the art. The container 12 is rotatably coupled to the generally planar surface 11 via the shaft 13. That is, the container 12 may pivot or swing about the shaft 13. In one embodiment the container 12 may include a ridge 16 that extends around the well 14. The ridge 16 provides a place for birds to stand and feed from the well 14.

As shown in FIG. 1, the bird feeder 10 includes an axle 17 that is coupled to an adapter 22 at one end and then coupled to the generally planar face 11 at another end. The bird feeder 10 may also include a cap structure 21 to cover the coupling point between the axle 17 and the generally planar surface 11. In another embodiment, the bird feeder 10 may not include the cap 21. Additionally, as shown in FIG. 1, the bird feeder 10 is coupled to a shaft 18 which is coupled to a base 19. As such, the bird feeder 10 may be positioned at an elevated position desired by the individual user.

Figure 2:
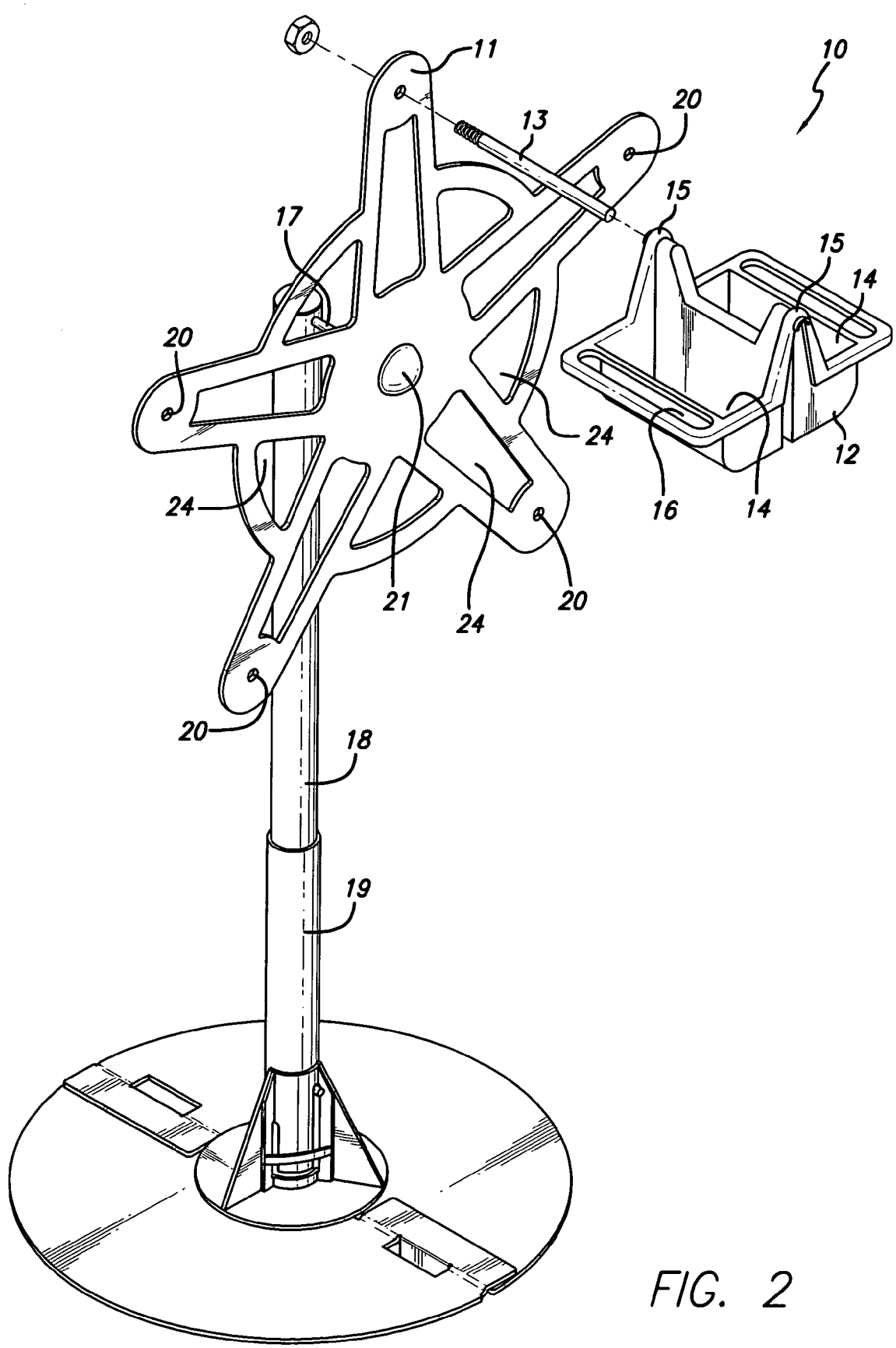
FIG. 2 is an exploded view of FIG. 1.
Figure 3:
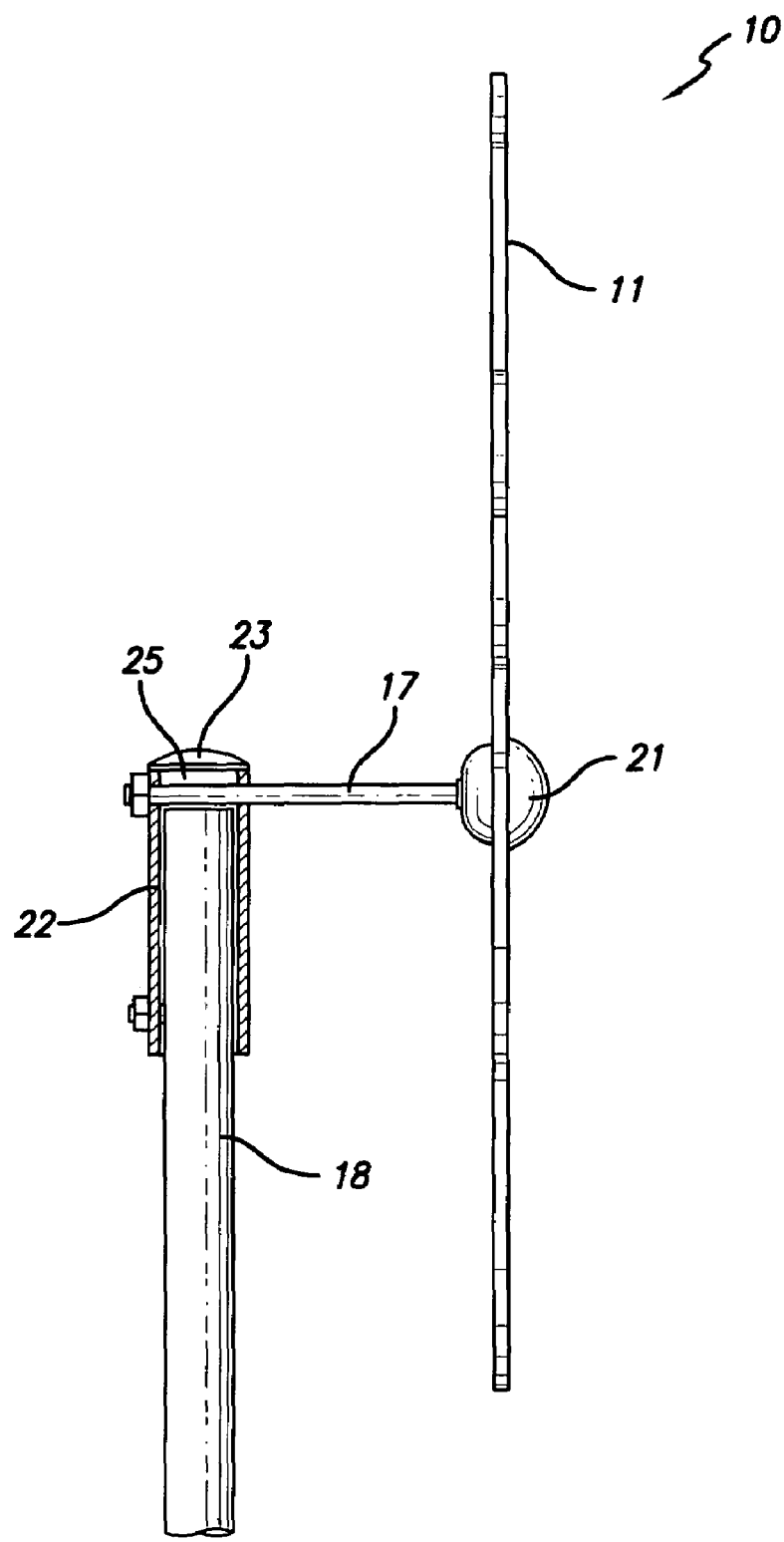
FIG. 3 is a cross-sectional plan view of one embodiment of a rotatable bird feeder.

FIG. 3 illustrates a cross section of one embodiment of the adapter 22. As shown in FIG. 2, the adapter 22 is a generally cylindrical structure. In other embodiments, the adapter 22 may be a structure having a cross section that is rectangular, square, triangular, or any other polygonal shape. Turning to FIG. 3, the adapter 22 may include a bore 25 that extends along the longitudinal axis. The adapter 22 may also include a cap 23. The adapter 22 also includes at least one through-hole that is perpendicular to the longitudinal axis of the bore 25. The through-holes are sized to engage the axle 17. In other embodiments, the axle 17 may have a cross section that is rectangular, square, triangular, or any other polygonal shape that is known or developed in the art. The corresponding rod 18 may be then inserted into the adapter 22.

Figure 4:
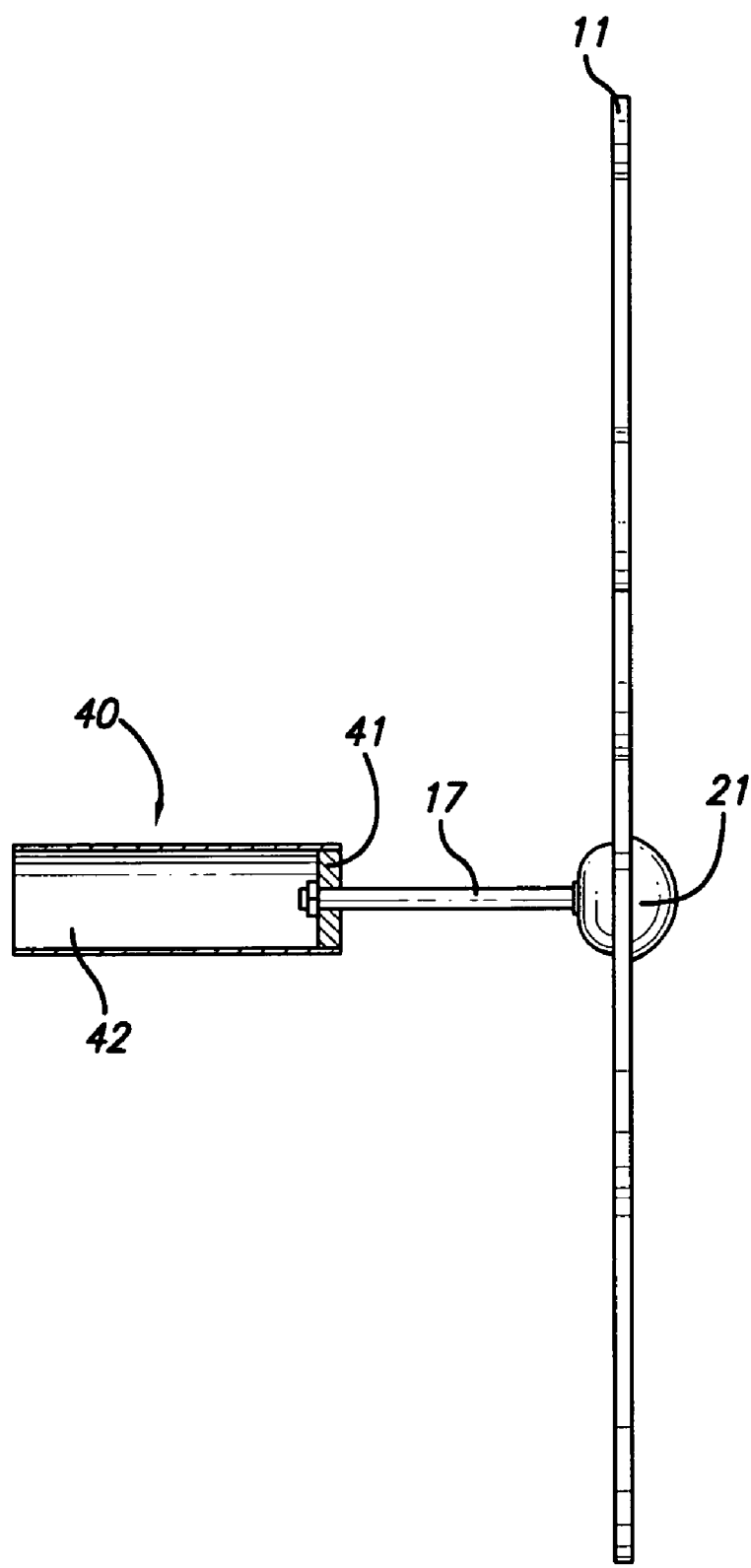
FIG. 4 is a cross-sectional plan view of another embodiment of a rotatable bird feeder.

FIG. 4 shows another embodiment of the adapter 40. The adapter 40 shown in FIG. 4 is similar to the adapter 22 shown in FIG. 3 with the exception of the orientation of the axle 17 with respect to the adapter 40. As shown in FIG. 4, the longitudinal axis of the axle 17 is substantially planar or parallel to the longitudinal axis of the bore 42 of the adapter 40. The end of the axle 17 may include an enlarged protuberance 41 or disk that is sized to engage the inner walls of the bore 42 of the adapter 40. As those skilled in the art will appreciate, the angle or orientation between the axle 17 and the adapter 40 may be varied approximately 1°–180°. In yet another embodiment, the axle 17 may be coupled to the adapter 40 that includes a portion (not shown) that is pivotable between ranges of varying angles.

In use, the bird feeder 10 may be provided with one or more container 12 that are coupled to the generally planar surface 11. Bird feed or other types of animal food are contained within the wells 14 of the container 12. Bird lands 16, other portions of the container 12, or the weight of the bird will cause the generally planar surface 11 to rotate about the axis 17. Furthermore, the containers 12 being rotatably coupled to the planar surface 11 will also rock or when a bird lands upon thereon. Accordingly, by providing one or more containers 12, one or more birds may feed at the same time thereby increasing the enjoyment of an individual watching the birds feed and interact with one another. Depending on the type of adapter 22 utilized with the bird feeder 10, the bird feeder 10 may be mounted in a plurality of locations and on a plurality of devices. In one embodiment, the adapter 22 may be mounted to a plate which has a plurality of openings thereby allowing the bird feeder to be coupled to a wall or other flat surface. The base 19 may be weighted or otherwise fixed to a surface such that in order to support the weight of the bird feeder 10. As those skilled in the art will appreciate, the length of the rod 18 may be varied depending upon the intended or desired application or use.

In closing, it is to be understood that the exemplary embodiments described herein are meant to be merely illustrative of the principles of the present invention. Other modifications that may be employed are within the scope of the various disclosed embodiments. Thus, by way of example, but not of limitation, alternative configurations may be utilized in accordance with the teachings herein. Accordingly, the drawings and descriptions are illustrative and not meant to be a limitation thereof. Thus, it is intended that the invention cover all embodiments and variations thereof as long as such embodiments and variations come within the scope of the appended claims and their equivalents.

What is claimed is:

1. A rotatable bird feeder comprising:
a substantially planar surface including at least one container pivotally coupled thereto, said at least one pivotally coupled container having at least two bird feed wells;
a first member adapted to support said substantially planar surface;
an axle projecting from said support member to terminate at a free first end pivotally coupled to said substantially planar surface, said axle including a second end affixed to said first support member via an adapter said adapter having a substantially tubular portion engaging a terminal end of said first support member in ensleeved manner and
a hub cap configured to cover the pivotal coupling between said first end of said axle and said substantially planar surface.

2. The rotatable bird feeder of claim 1, wherein said first support member has a substantially cylindrical configuration.

3. The rotatable bird feeder of claim 2, wherein said substantially tubular adapter is fitted over said substantially cylindrical first support member.

4. The rotatable bird feeder of claim 3, wherein said second end of said axle is threaded through said fitted adapter and said first support member.

5. The rotatable bird feeder of claim 4, wherein said fitted adapter and said first support member are secured via said threaded second end of said axle.

6. The rotatable bird feeder of claim 5, wherein said secured adapter is provided with a cap at one end.

7. The rotatable bird feeder of claim 1, wherein said substantially tubular adapter is coupled to said axle at an angle.

8. The rotatable bird feeder of claim 1, wherein said substantially tubular adapter is coupled to said axle in a substantially planar fashion.

9. The rotatable bird feeder of claim 8, wherein said second end of said axle is substantially disk-shaped.

10. The rotatable bird feeder of claim 8, wherein said second end of said axle is affixed to a substantially disk-shaped protuberance.

11. The rotatable bird feeder of claim 9, wherein said second disk-shaped end of said axle is adapted to frictionally engage the inner wall of said substantially tubular adapter.

12. The rotatable bird feeder of claim 10, wherein said disk-shaped protuberance is adapted to frictionally engage the inner wall of said substantially tubular adapter.

13. The rotatable bird feeder of claim 1, wherein said adapter has a substantially polygonal cross section.

14. A vertically orientated rotatable bird feeder, comprising:
a generally planar holding structure in the form of a sheet for at least one bird feed container:
a first member configured to support said holding structure for rotational movement in a vertical plane said first support member being generally rigid and having a substantially inverted-T cross section and being adapted for elevational adjustment; and
an axle projecting from said support member to terminate at a free first end pivotally coupled to said holding structure, said axle including a second end secured to said first support member via an adapter, said adapter having a substantially tubular portion engaging a terminal end of said first support member in ensleeved manner, said second secured end of said axle being disposed at an angle to said adapter.

15. The rotatable bird feeder of claim 14, wherein said adapter is configured to mate with one end of said first support member.

16. The rotatable bird feeder of claim 15, wherein said holding structure is substantially star-shaped.

17. The rotatable bird feeder of claim 16, wherein said at least one bird feed container is rotatably coupled to said substantially star-shaped holding structure via at least one shaft.

18. The rotatable bird feeder of claim 17, wherein said at least one shaft is coupled to said substantially star-shaped holding structure at an angle.

19. The rotatable bird feeder of claim 17, wherein said at least one shaft is substantially L-shaped.

20. The rotatable bird feeder of claim 14, further comprising a hub cap configured to cover the pivotal coupling between said first end of said axle and said holding structure.

* * * * *